US011301131B2

(12) United States Patent
Li

(10) Patent No.: US 11,301,131 B2
(45) Date of Patent: Apr. 12, 2022

(54) METHOD FOR SPLIT-SCREEN DISPLAY, TERMINAL, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventor: Hui Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/810,213

(22) Filed: Mar. 5, 2020

(65) Prior Publication Data

US 2020/0201545 A1 Jun. 25, 2020

Related U.S. Application Data

(63) Continuation of application No. PCT/CN2018/102753, filed on Aug. 28, 2018.

(30) Foreign Application Priority Data

Sep. 7, 2017 (CN) .......................... 201710801238.8

(51) Int. Cl.
*G06F 3/04886* (2022.01)
*G06F 9/451* (2018.01)
(Continued)

(52) U.S. Cl.
CPC ...... *G06F 3/04886* (2013.01); *G06F 3/04817* (2013.01); *G06F 3/04883* (2013.01); *G06F 9/451* (2018.02)

(58) Field of Classification Search
None
See application file for complete search history.

(56) References Cited

U.S. PATENT DOCUMENTS 9,015,627 B2 * 4/2015 Lal .................. G06F 3/0488
715/834
2016/0202869 A1 * 7/2016 Kim .................. G06F 1/1626
715/841
(Continued)

FOREIGN PATENT DOCUMENTS

CN 103593623 A 2/2014
CN 104735255 A 6/2015
(Continued)

OTHER PUBLICATIONS

Extended European search report issued in corresponding European application No. 18853453.1 dated Sep. 10, 2020.
(Continued)

*Primary Examiner* — Brian M Butcher
(74) *Attorney, Agent, or Firm* — Young Basile Hanlon & MacFarlane, P.C.

(57) ABSTRACT

A method for split-screen display is provided and a terminal are provided, which relate to the field of electronic technologies. The method includes the following. A first interface is displayed in a display region of a screen of the terminal. An operation signal in a preset direction is detected in a preset region at an edge of the terminal, while displaying the first interface. The display region of the screen is divided into at least two sub-regions according to the operation signal detected, where the first interface is displayed in a first sub-region of the at least two sub-regions.

7 Claims, 14 Drawing Sheets

(51) Int. Cl.
*G06F 3/04817* (2022.01)
*G06F 3/04883* (2022.01)

(56) References Cited

U.S. PATENT DOCUMENTS

| | | | |
|---|---|---|---|
| 2016/0313966 A1* | 10/2016 | Jeong | G04G 21/00 |
| 2016/0320810 A1* | 11/2016 | Kim | G06F 1/1669 |
| 2016/0379598 A1 | 12/2016 | Nguyen et al. | |
| 2017/0205990 A1 | 7/2017 | Ma | |
| 2017/0322760 A1* | 11/2017 | Soh | B60K 37/06 |
| 2019/0172422 A1* | 6/2019 | Chen | G06F 3/165 |
| 2019/0205011 A1* | 7/2019 | Li | G06F 3/147 |

FOREIGN PATENT DOCUMENTS

| | | |
|---|---|---|
| CN | 105808136 A | 7/2016 |
| CN | 106210289 A | 12/2016 |
| CN | 106293772 A | 1/2017 |
| CN | 106507173 A | 3/2017 |
| CN | 106547506 A | 3/2017 |
| CN | 106598529 A | 4/2017 |
| CN | 106775313 A | 5/2017 |
| CN | 106775314 A | 5/2017 |
| CN | 106951170 A | 7/2017 |
| CN | 106959796 A | 7/2017 |
| CN | 107066269 A | 8/2017 |
| EP | 2328062 A2 | 6/2011 |
| EP | 2767896 A1 | 8/2014 |

OTHER PUBLICATIONS

International search report issued in corresponding international application No. PCT/CN2018/102753 dated Nov. 29, 2018.

* cited by examiner

METHOD FOR SPLIT-SCREEN DISPLAY, TERMINAL, AND NON-TRANSITORY COMPUTER READABLE STORAGE MEDIUM

CROSS-REFERENCE TO RELATED APPLICATION(S)

This application is a continuation of International Patent Application No. PCT/CN2018/102753, filed on Aug. 28, 2018, which claims priority to Chinese Patent Application No. 201710801238.8, filed on Sep. 7, 2017, the disclosures of both of which are hereby incorporated by reference in their entireties.

TECHNICAL FIELD

This disclosure relates to the field of electronic technology, and more particularly to a method for split-screen display, a terminal, and a non-transitory computer readable storage medium.

BACKGROUND

As terminals are becoming more powerful, an increasing number of applications can be run inside the terminal. In some situations, the terminal may simultaneously launch two or more applications and want to simultaneously display interfaces of the two or more applications in a display component. In this case, a split-screen function needs to be enabled, that is, the interfaces of the two or more applications are respectively displayed on a display interface which has been split.

In the related art, a virtual button (such as a circular button) which is used for triggering a split of the display interface may be displayed on the display interface. Upon detecting that the virtual button is clicked by a user, the split-screen function can be enabled.

SUMMARY

According to one aspect, a method for split-screen display for a terminal is provided. The method includes the following. A first interface is displayed in a display region of a screen of the terminal. While the first interface is displayed, a first operation signal in a preset direction is detected in a preset region at an edge of the screen. The display region of the screen is divided into at least two sub-regions according to the first operation signal detected, where the first interface is displayed in a first sub-region of the at least two sub-regions.

According to another aspect, a terminal is provided. The terminal includes a processor, a display screen, a memory, and a sensor. The display screen has a display region. The sensor is configured to detect a first operation signal in a preset region, where the preset region is at an edge of the display screen. The memory is configured to store computer programs which, when executed by the processor, are operable with the processor to: display a first interface in the display region; divide the display region into at least two sub-regions according to the first operation signal detected by the sensor, where the first interface is displayed in a first sub-region of the at least two sub-regions.

According to yet another aspect, a non-transitory computer readable storage medium is provided. The non-transitory computer readable storage medium is configured to store at least one instruction, at least one program, a code set, or an instruction set. The at least one instruction, the at least one program, the code set, or the instruction set, when executed by a processor, causes the processor to: display a first interface in a display region of a screen of a terminal; detect, in a preset region at an edge of the screen, a first operation signal in a preset direction, while displaying the first interface; divide the display region of the screen into at least two sub-regions according to the first operation signal detected, where the first interface is displayed in a first sub-region of the at least two sub-regions.

BRIEF DESCRIPTION OF DRAWINGS

The accompanying drawings, which are incorporated in and constitute a part of the specification, illustrate some implementations consistent with the disclosure. The accompanying drawings along with the description is intended to explain the principles of the implementations of the disclosure.

Figure 1:
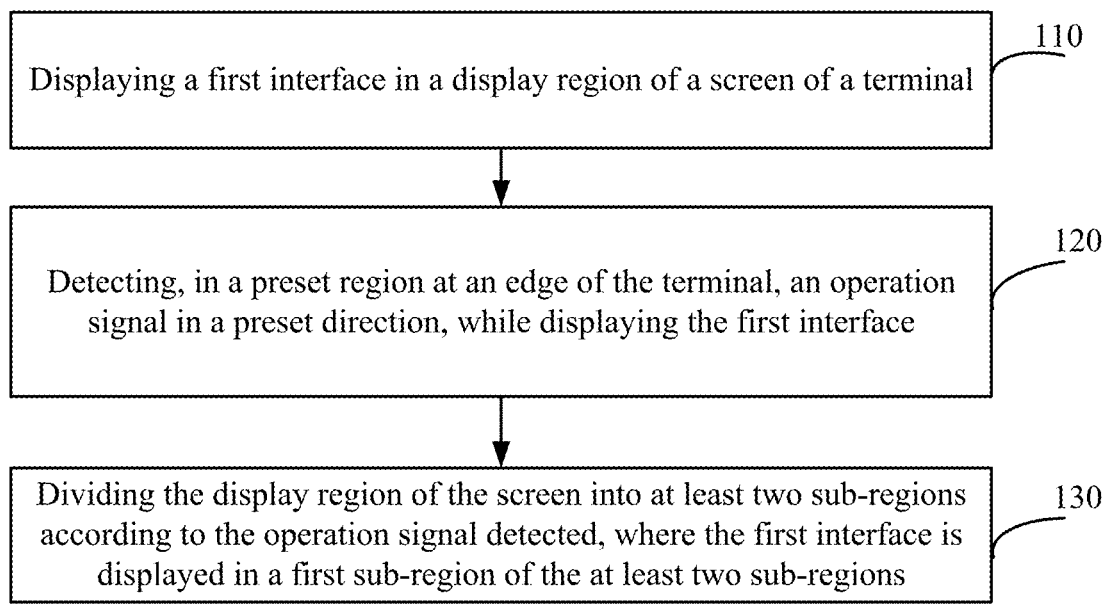
FIG. 1 is a schematic flowchart illustrating a method for split-screen display according to at least one implementation.

Implementations have been illustrated with the above accompanying drawings, and the following will describe in further detail the accompanying drawings used for describing the implementations. The accompanying drawings and text description are used for explaining the concept of the implementations to those skilled in the art with reference to some implementations, rather than limiting in any manner the scope of the concept of the implementations.

DETAILED DESCRIPTION

Hereinafter, example implementations will be described in detail in conjunction with the accompanying drawings. It should be noted that in the following description, the same numbers in different accompanying drawings denote the same or similar elements unless stated otherwise. The example implementations described herein do not represent all of the implementations of the disclosure. Instead, they are merely some examples of devices and methods consistent with aspects related to the disclosure as recited in the appended claims.

In at least one implementation, a method for split-screen display is provided. The method may be implemented by a terminal with a curved surface screen or a full screen. In one example, the terminal may be a mobile terminal, for example, the terminal is a mobile phone or a tablet computer.

"Split-screen display" refers to a display technique in which different applications are displayed in different regions of a display screen. Different regions can be deemed as different split-screen windows.

The terminal may include a processor, a memory, an input component, and other components. The processor may be a central processing unit (CPU) and can be configured to detect an operation signal in a preset direction. The memory may be a random access memory (RAM) or a flash memory, and can be configured to store data, data required for processing, and data generated during the processing, such as application icons (or icons of applications) and so on. The input component may be a curved surface screen, a full screen, a keyboard, or a mouse.

The terminal may further include a transceiver, a display component, an audio output component, and the like. The transceiver can be used for data transmission with a server. The transceiver may include a Bluetooth component, a wireless-fidelity (Wi-Fi) component, antennas, matching circuits, a modem, and so on. The audio output component may be a speaker or a headphone.

Various system programs and applications are installed in the terminal. The system programs may be an Android® system, an iOS® system, or the like. During use of the terminal, users may use various applications according to their different needs. For example, user A needs to browse in a microblog application while chatting with user B through an instant messaging application. In this case, a method for split-screen display may be adopted to simultaneously display interfaces of the instant messaging application and the microblog application. The method for split-screen display is also applicable to other scenarios, which are not illustrated herein.

According to implementations, a method for split-screen display is provided. The method is applicable to a terminal and includes the following. A first interface is displayed in a display region of a screen of the terminal. While the first interface is displayed, an operation signal in a preset direction is detected in a preset region at an edge of the terminal. The display region of the screen is divided into at least two sub-regions according to the operation signal detected, where the first interface is displayed in a first sub-region of the at least two sub-regions.

In at least one implementation, after dividing the display region of the screen into the at least two sub-regions according to the operation signal detected, the following can be conducted. At least one icon of at least one application is displayed. In response to receiving a selection instruction for an icon of a target application, an interface of the target application is displayed in a second sub-region of the at least two sub-regions.

In at least one implementation, the display region of the screen is divided into the at least two sub-regions according to the operation signal detected as follows. A present position of the operation signal is determined. According to the present position of the operation signal, generate at least one sub-region boundary line according to which the display region is divided into the at least two sub-regions.

In at least one implementation, the preset direction includes a direction from a top of the edge of the terminal to a bottom of the edge of the terminal and/or a direction from the bottom of the edge of the terminal to the top of the edge of the terminal.

In at least one implementation, the method further includes the following. The two sub-regions are merged, upon detecting, in the preset region at the edge of the terminal, an operation signal starting at one end of a sub-region boundary line between the two sub-regions and in a first direction perpendicular to the sub-region boundary line. Display, in the display region merged, an interface in one sub-region of the two sub-regions on a second direction side of the sub-region boundary line, where the second direction is opposite to the first direction.

In at least one implementation, the terminal has a curved surface screen, and the preset region at the edge of the terminal refers to at least one curved-surface side edge of the curved surface screen.

In at least one implementation, the preset region at the edge of the terminal refers to two curved-surface side edges of the curved surface screen which are opposite to each other in a vertical direction. The display region of the screen is divided into the at least two sub-regions according to the operation signal detected as follows. Upon detecting simultaneously at each of the two curved-surface side edges a sliding signal in the preset direction, the display region of the curved surface screen is divided into multiple sub-regions.

In at least one implementation, the display region of the curved surface screen is divided into the multiple sub-regions upon detecting simultaneously at each of the two curved-surface side edges the sliding signal in the preset direction as follows. Determine a connecting line between a present position of the sliding signal at one curved-surface side edge and a present position of the sliding signal at the other curved-surface side edge. According to the connecting line, generate a sub-region boundary line for dividing the display region into the multiple sub-regions.

In at least one implementation, after dividing the display region of the screen into the at least two sub-regions according to the operation signal, the following can be conducted. Upon detecting simultaneously at each of two curved-surface side edges a sliding signal in the preset direction, an area ratio of each of the at least two sub-regions to the display region of the screen is adjusted according to the sliding signal.

In some implementations, a method for split-screen display is provided. As illustrated in FIG. 1, the method begins at block 110.

At block 110, a first interface is displayed in a display region of a screen of the terminal.

In one example, the screen includes but is not limited to a curved surface screen, a full screen, a special-shaped screen, or the like. The first interface may be an interface displayed in the display region before division (that is, the display region has not been divided), such as a main interface of an operating system or an interface of an application.

In one example, the display region of the screen may be the whole display region of the screen or a partial display region of the screen. The terminal displays, in the whole display region or the partial display region of the screen, the first interface in a full-screen mode.

In one example, the screen of the terminal is a special-shaped screen. The special-shaped screen includes a primary display region and a secondary display region. The primary display region and the secondary display region are different display regions of the special-shaped screen. A first display area of the primary display region is larger than a second display area of the secondary display region.

The primary display region is a rectangular display region on the special-shaped screen, and the secondary display region is a special-shaped display region on the special-shaped screen. The primary display region and the secondary display region constitute the whole display region of the special-shaped screen.

In addition, the special-shaped screen includes three straight-line edges and a curved-line edge with a recessed part. The primary display region is a region in which a largest rectangle is located, where the largest rectangle is surrounded by the three straight-line edges and an edge of the recessed part. The secondary display region is the remaining display region other than the primary display region. In one example, the secondary display region is embodied as one or two secondary display region(s).

In one example, when the screen of the terminal is a special-shaped screen, the terminal displays the first interface in the whole display region (that is, the primary display region and the secondary display region) of the special-shaped screen. Alternatively, the terminal displays the first interface in the primary display region of the special-shaped screen.

The first interface is the main interface of the operating system or the interface of the application. The application is a native application for the operating system or a third-party application. In one example, a usage status of the terminal may include a landscape screen status or a portrait screen status. For the convenience of description, the following takes the portrait screen status as an example to describe the usage status of the terminal.

At block 120, while displaying the first interface, an operation signal in a preset direction is detected in a preset region at an edge of the terminal.

For the terminal having a side frame member, the side frame member is on the edge of the terminal, the side frame member is provided with a sensor, and the sensor can be used to detect an operation signal.

The sensor may be a light sensor, a motion sensor, and other sensors. The light sensor may include an ambient light sensor and a proximity sensor, among which the ambient light sensor may adjust the brightness of the display screen according to ambient lights, and the proximity sensor may turn off the display screen and/or backlight when the terminal reaches nearby the ear. The motion sensor can include an accelerometer sensor which can detect the magnitude of acceleration in all directions and when the terminal is stationary, the accelerometer sensor can detect the magnitude and direction of gravity; the accelerometer sensor can also identify gestures of the terminal (such as vertical and horizontal screen switch), or the accelerometer sensor can be used for vibration-recognition related functions (such as a pedometer, percussion) and so on. The terminal can also be equipped with a barometer, a hygrometer, a thermometer, and an infrared sensor and other sensors.

For the curved surface screen, the preset region may refer to curved-surface side edges. In at least one implementation, the terminal has the curved surface screen, and the preset region at the edge of the terminal refers to at least one curved-surface side edge of the curved surface screen. For the full screen, the preset region may be within a region having a certain width from an edge of the screen.

The preset region is at the edge of the terminal, for example, the preset region is at a top of the edge of the screen or a bottom of the edge of the screen. The split-screen may be performed only when the operation signal in the preset region is detected. In one example, in addition to dividing, according to the operation signal, the display region of the screen into the multiple sub-regions and adjusting, according to the operation signal, a position of a sub-region boundary line, the display region may be evenly divided into two sub-regions automatically when a pressing signal in a preset region at the edge of the terminal is detected, and the position of the sub-region boundary line between the two sub-regions can be dynamically adjusted when an operation signal at a curved-surface side edge corresponding to one end of the sub-region boundary line is detected.

In at least one implementation, the terminal can detect, in the preset region at the edge of the screen, the operation signal in the preset direction. The operation signal may be a tap signal, a double tap signal, a long-press signal, or a sliding signal.

In one example, the first interface has a first short edge, a first long edge, a second short edge, and a second long edge. In one example, the operation signal may include a sliding signal applied on the first long edge and a sliding signal applied on the second long edge, where the sliding signal applied on the first long edge and the sliding signal applied on the second long edge may simultaneously slide along the preset direction.

For example, when the terminal is in a portrait screen status, the operation signal may be two sliding signals that simultaneously slide up from the left edge and the right edge of the screen of the terminal.

At block 130, the display region of the screen is divided into at least two sub-regions according to the operation signal detected, where the first interface is displayed in a first sub-region of the at least two sub-regions.

In one example, when the terminal detects, in the preset region at the edge of the screen, the operation signal in the preset direction, the terminal enters a split-screen display mode, and displays a first sub-region and a second sub-region on the display region of the screen, where the first sub-region is used for display of the first interface and the second sub-region is used for display of other user interfaces other than the first interface.

In one example, the first sub-region is also known as a first split-screen window, and the second sub-region is also known as a second split-screen window.

In one example, when the terminal is in the split-screen display mode while in the portrait screen status, the first sub-region is displayed on the upper part of the screen, and the second sub-region is displayed on the lower part of the screen.

In some occasions, when a user needs to simultaneously view interfaces of two or more applications on the screen, the user can slide, with a finger, in the preset direction in the preset region at the edge of the terminal. For the convenience of description, the following describes a curved surface screen as an example of the screen of the terminal. For operations of the method for split-screen display for a full screen or a special-shaped screen, reference can be made to operations of the method for split-screen display for the curved surface screen, which will not be described in detail herein.

Figure 2:
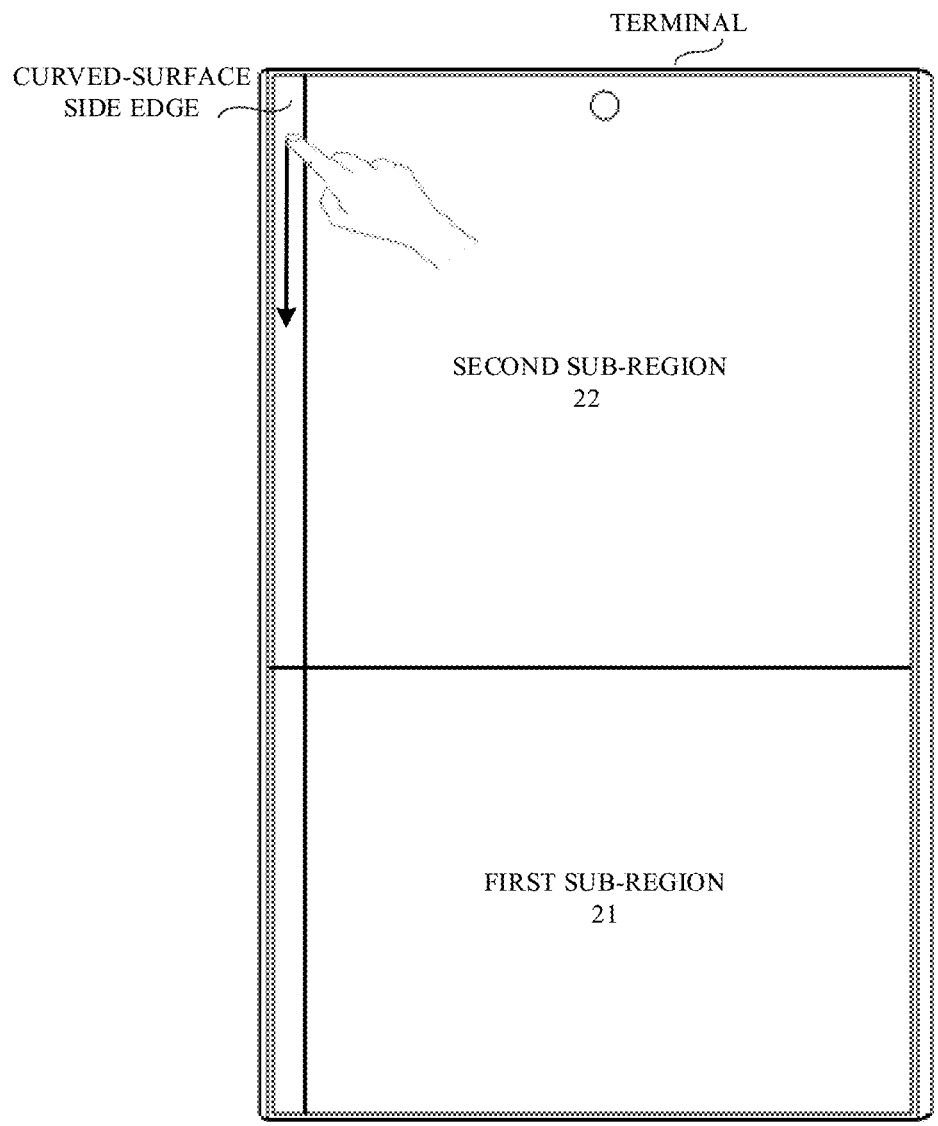
FIG. 2 is a schematic diagram illustrating a situation in which split-screen is triggered by a gesture of a user according to implementations.

As illustrated in FIG. 2, the user can slide, with one finger of the right hand on a curved-surface side edge of the curved surface screen, in a direction from the top of the curved-surface side edge to the bottom of the curved-surface side edge. In this situation, the terminal may detect a sliding signal in the preset direction. Upon detecting the sliding signal in the preset direction, the display region of the curved surface screen is triggered to be divided into multiple sub-regions, for example, the display region of the curved surface screen is evenly divided into a first sub-region 21 and a second sub-region 22 that are respectively displayed on the upper part and the lower part of the curved surface screen. The first sub-region 21 among the multiple sub-regions may be a predetermined region, or may be a region selected by the user. The first sub-region 21 is used for display of the interface displayed in the display region before the division. It should be noted that, the display region before the division may be the whole display region of the screen, the interface which is displayed in the display region before the division may be a main interface of an operating system, such as the main interface of the Android® system or the main interface of the iOS® system, or an interface of an application.

It should be noted that, the terms of orientation referred to in the foregoing implementations, such as "upper", "lower", "left", "right", "top", or "bottom", are described on condition that the terminal is in a portrait screen status.

The curved surface screen may include a single curved-surface side edge or two curved-surface side edges. The method described herein can be applied to the terminal with a screen having a single curved-surface side edge or two curved-surface side edges. In at least one implementation, the preset region at the edge of the terminal may refer to the two curved-surface side edges of the curved surface screen which are opposite to each other in a vertical direction. The display region of the screen is divided into the multiple sub-regions according to the operation signal detected as follows. The display region of the curved surface screen is divided into the multiple sub-regions, upon detecting simultaneously at each of the two curved-surface side edges a sliding signal in the preset direction.

Figure 3:
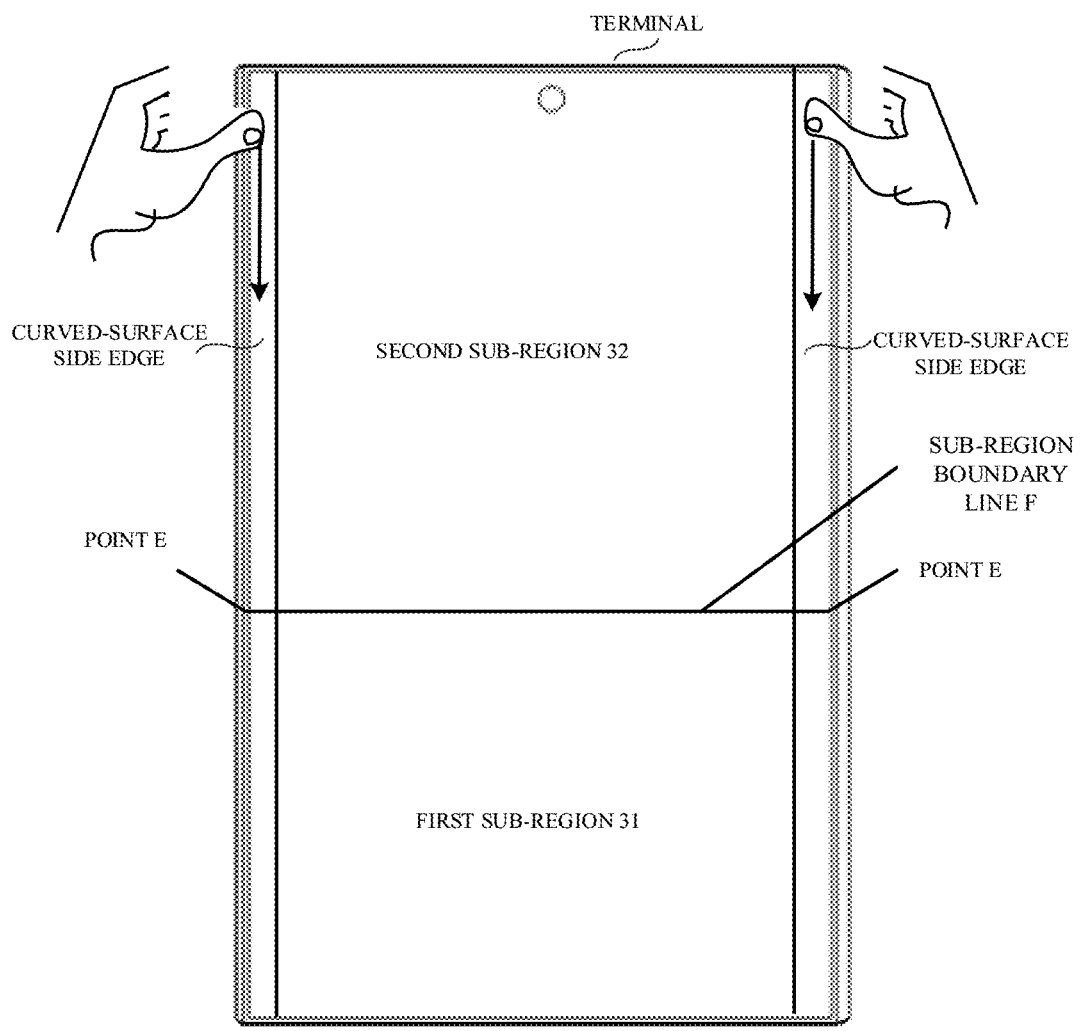
FIG. 3 is a schematic diagram illustrating a situation in which split-screen is triggered by a gesture of a user according to other implementations.

In one example, as illustrated in FIG. 3, the user can slide, simultaneously with one finger of the left hand and one finger of the right hand on the two curved-surface side edges of the curved surface screen, in a direction from the top of the curved-surface side edge to the bottom of the curved-surface side edge. In this situation, the terminal can detect the operation signal in the preset direction. When the operation signal in the preset direction is detected, the display region of the curved surface screen is triggered to be divided into a first sub-region 31 and a second sub-region 32.

In at least one implementation, the preset direction includes a direction from the top of the edge of the terminal to the bottom of the edge of the terminal and/or a direction from the bottom of the edge of the terminal to the top of the edge of the terminal.

In one example, the following program execution logic may be set in the terminal. As an example, the display region of the screen can be triggered to be divided into the multiple sub-regions only when an operation signal in a direction from the top of the edge of the terminal to the bottom of the edge of the terminal is detected. As another example, the division of the display region of the screen into the multiple sub-regions can be triggered only when an operation signal in a direction from the bottom of the edge of the terminal to the top of the edge of the terminal is detected. As yet another example, the display region of the screen can be triggered to be divided into the multiple sub-regions when any one of the operation signal in the direction from the top of the edge of the terminal to the bottom of the edge of the terminal and the operation signal in the direction from the bottom of the edge of the terminal to the top of the edge of the terminal is detected.

In at least one implementation, the display region of the screen is divided into the at least two sub-regions according to the operation signal detected as follows. A present position of the operation signal is determined. According to the present position of the operation signal, generate at least one sub-region boundary line for dividing the display region into the at least two sub-regions.

For example, as illustrated in FIG. 3, the user slides in a direction from the top of the edge of the terminal to the bottom of the edge of the terminal, if the sliding operation stops at a certain time at point E, point E is the present position of the operation signal, and thus according to point E, a sub-region boundary line F is determined, according to which the display region is divided into the first sub-region 31 and the second sub-region 32.

In at least one implementation, if the terminal has the curved surface screen, and the curved surface screen includes two curved-surface side edges, the display region of the curved surface screen is divided into the multiple sub-regions upon detecting simultaneously at each of the two curved-surface side edges the sliding signal in the preset direction as follows. Determine a connecting line between a present position of the sliding signal at one curved-surface side edge and a present position of the sliding signal at the other curved-surface side edge, and generate, according to the connecting line, a sub-region boundary line for dividing the display region into the multiple sub-regions.

It should be noted that, the sub-region boundary line may be a boundary line of two sub-regions corresponding to two applications among the multiple applications and the above method is not necessarily applicable only to the split-screen operation for two applications.

Figure 4:
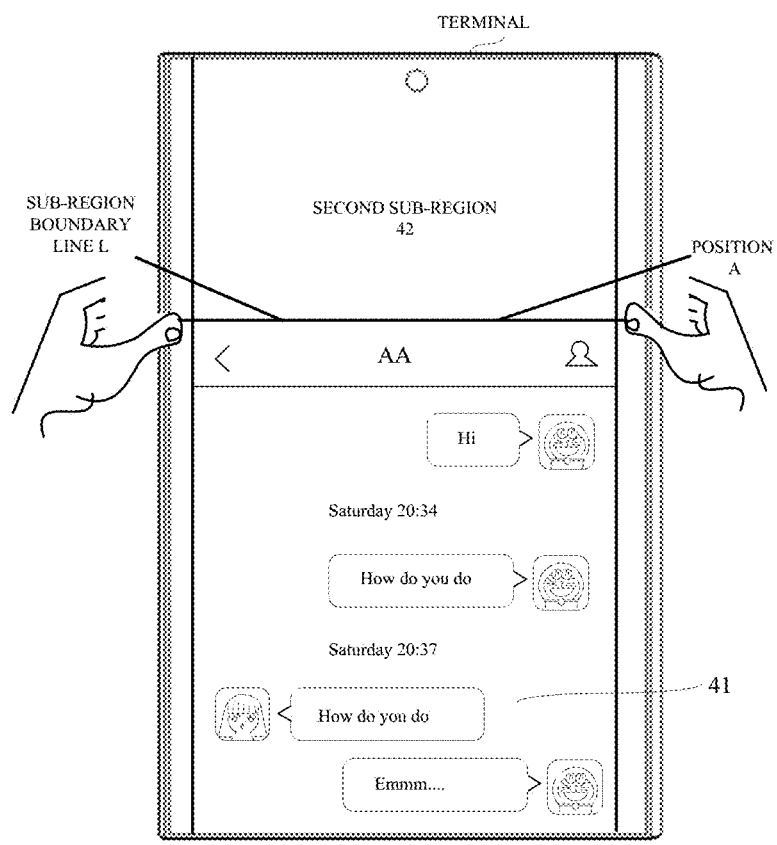
FIG. 4 is a schematic diagram illustrating adjustment of a sub-region boundary line according to implementations.
Figure 5:
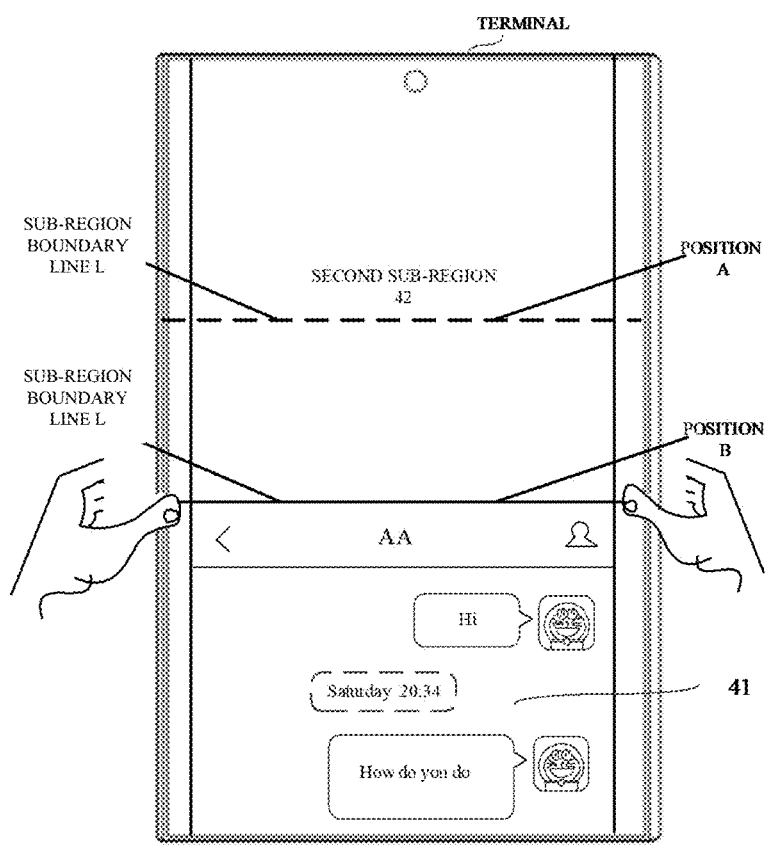
FIG. 5 is a schematic diagram illustrating adjustment of a sub-region boundary line according to other implementations.

In addition, besides dividing the display region of the screen into the multiple sub-regions, each of which has a predetermined size, the area of each of the multiple sub-regions can also be dynamically adjusted according to a user's gesture. In one example, the first sub-region may be the whole display region of the screen before the division. Upon detecting, in the preset region at the edge of the screen, the sliding signal in the preset direction, the display region of the first sub-region gradually decreases according to a position of the sliding signal. As illustrated in FIG. 4, an interface of an instant messaging application is displayed in the first sub-region 41, and no interface is displayed in the second sub-region 42. When a sliding signal in a direction from the top of the edge of the screen to the bottom of the edge of the screen is detected in the preset region at the edge of the screen, according to a position of the user's finger detected at time T1 (that is, a present position of the sliding signal), the position of the sub-region boundary line L between the two sub-regions is determined to be at position A. In practical situations, if position A is not appropriate, that is, the display region occupied by the interface of the instant messaging application is too large, the user can continue to slide, with his or her finger, in a direction from the top of the edge of the screen to the bottom of the edge of the screen. As illustrated in FIG. 5, according to a position of the user's finger detected at time 72, the position of the sub-region boundary line L is adjusted to position B.

In at least one implementation, after dividing the display region of the screen into the at least two sub-regions according to the operation signal detected, the following can be performed. Display at least one icon of at least one application (that is, at least one application icon). In response to receiving a selection instruction against an icon of a target application, an interface of the target application is displayed in a second sub-region of the at least two sub-regions. For example, once the target application icon is clicked, the target application is launched, and the interface of the target application is displayed in the second sub-region.

Figure 6A:
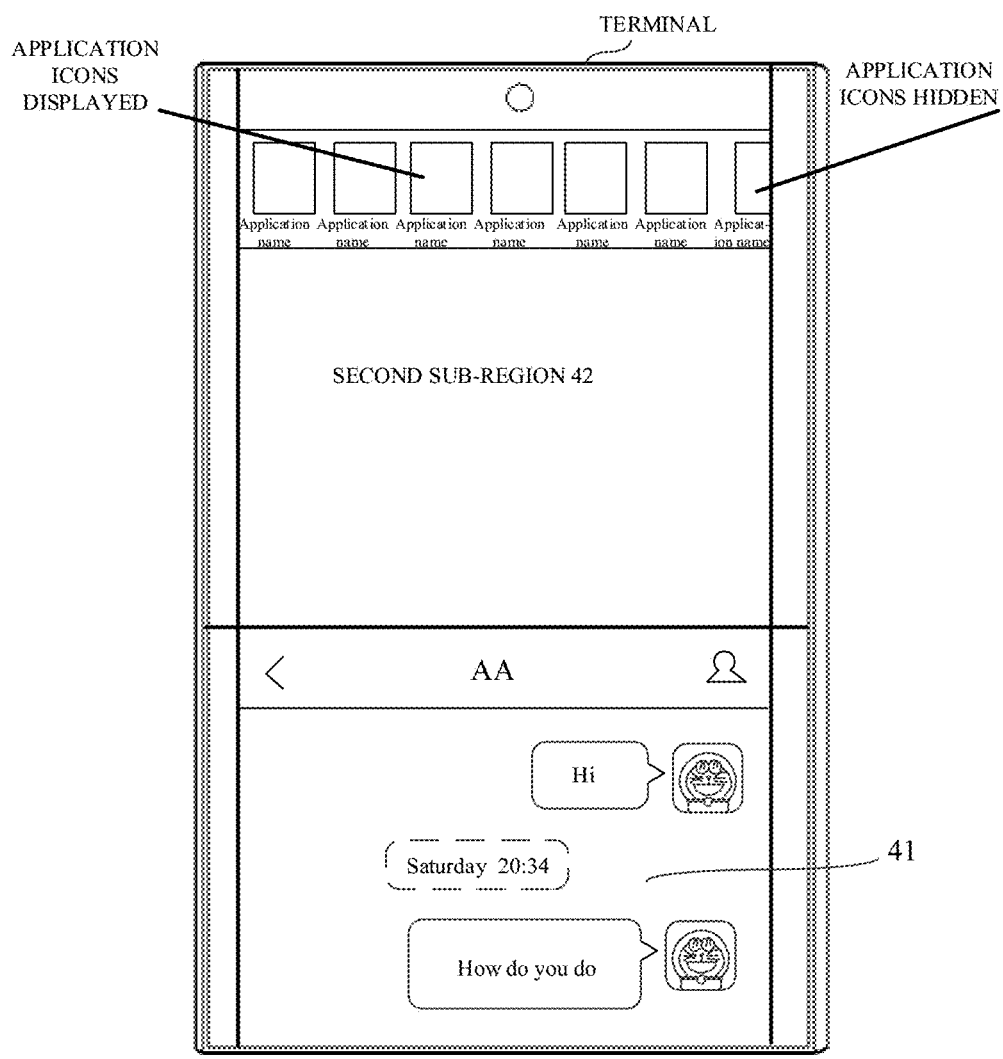
FIG. 6A is a schematic diagram illustrating display of application icons according to at least one implementation.

In one example, the at least one application may include all applications installed inside the terminal. Based on the sub-region boundary line in FIG. 4, as illustrated in FIG. 6A, when too many applications have been installed in the terminal, some application icons may be hidden. When the user slides in the display region of the application icons, the application icons hidden can be displayed. In addition, the at least one application may be applications that are most frequently used by the user, or may be applications running in the background of the system, and there is no restriction on the type of the at least one application in implementations.

In one example, the terminal displays the at least one icon of the at least one application as follows. The terminal acquires a first application corresponding to the first interface, acquires a target application set corresponding to the first application according to a preset correspondence relationship, and displays an icon of each application in the target application set.

In one example, the terminal may pre-store the correspondence relationship between the first application and the target application set.

In one example, the manner in which the terminal displays the icon of each application in the target application set includes but is not limited to the following two manners.

For example, as illustrated in FIG. 6A, the first interface is scaled down and displayed in the first partial region (such as the first sub-region) of the screen, and a first control bar is displayed in a second partial region (such as the second sub-region) of the screen, where the icon of each application in the target application set is displayed on the first control bar.

The first partial region and the second partial region are two different regions of the screen.

Figure 6B:
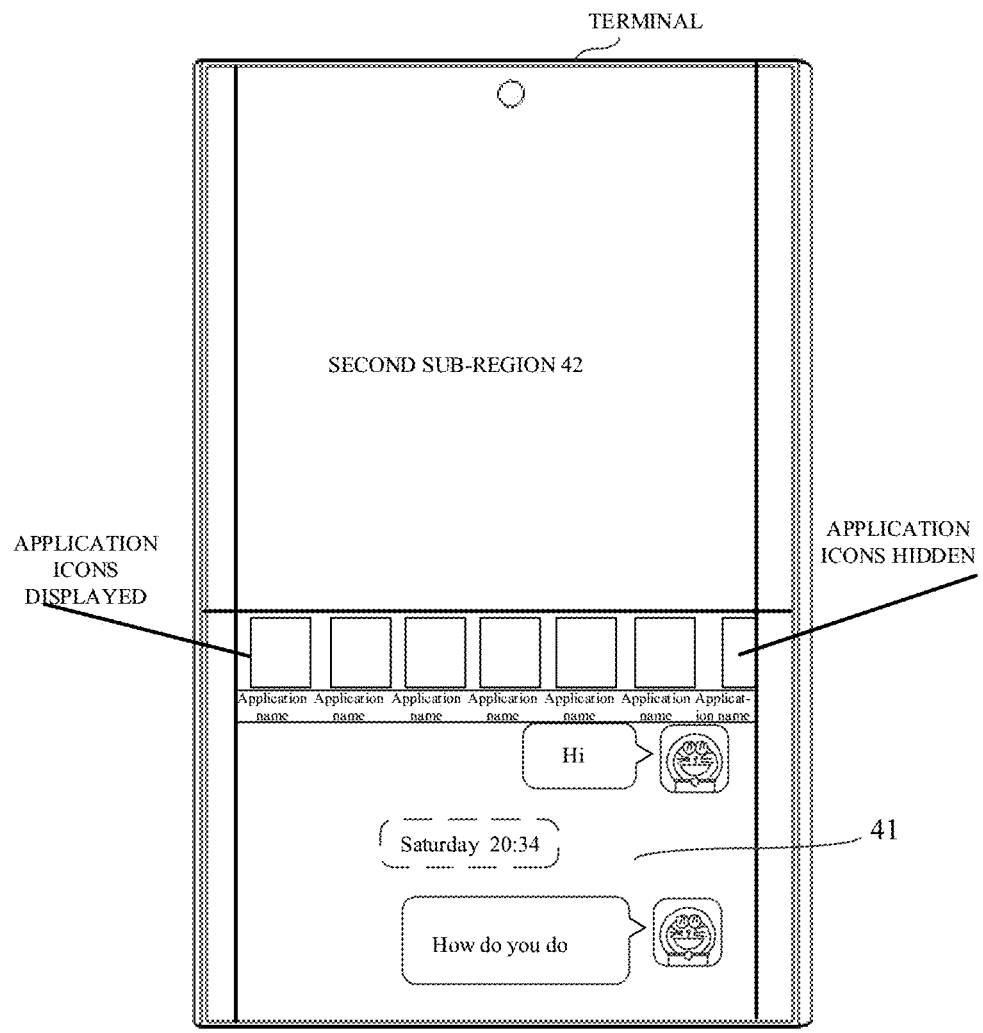
FIG. 6B is a schematic diagram illustrating display of application icons according to at least one implementation.

For another example, as illustrated in FIG. 6B, the terminal keeps the first interface that has been scaled down unchanged, and the first interface and a second control bar overlap, where the icon of each application in the target application set is displayed on the second control bar.

Figure 7:
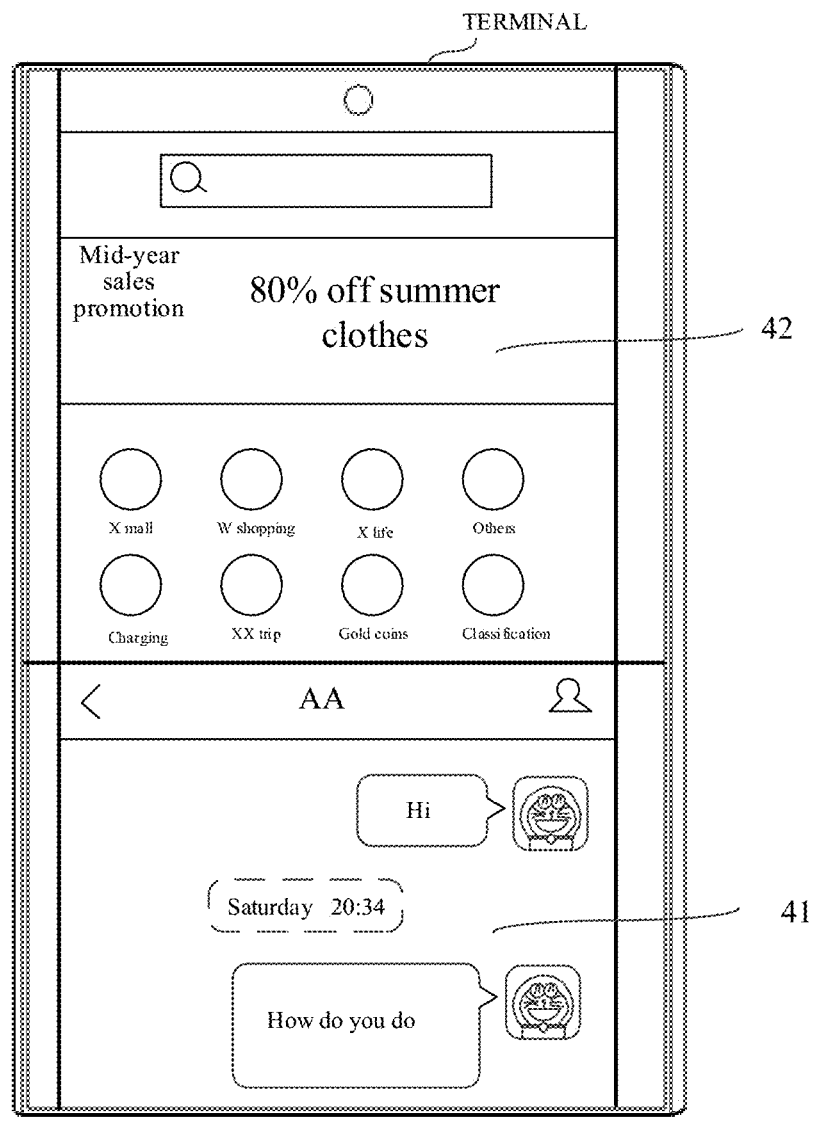
FIG. 7 is a schematic diagram illustrating a split-screen result according to at least one implementation.

In one example, based on the sub-region boundary line in FIG. 4, after or prior to adjusting the position of the sub-region boundary line by the user, in response to receiving a selection instruction for an icon of a target application, an interface of the target application is displayed in the second sub-region. For example, when the user needs to simultaneously view the interface of the instant messaging application and an interface of an online shopping application, the user can first launch the interface of the instant messaging application and then click the online shopping application icon of the at least one application icon displayed, such that the interface of the online shopping application can be displayed. The above two interfaces are finally displayed in a manner illustrated in FIG. 7.

In one example, since the display region subjected to splitting (that is, the sub-region) does not occupy the whole screen, the interface in each of the sub-regions can be scaled separately (that is, the size of the interface in each of the sub-regions can be changed separately). Alternatively, the interface in each of the sub-regions may not be scaled, with only part of the interface in the sub-region displayed and the remaining part of the interface hidden. When the user drags the displayed part of the interface, the hidden part of the interface may be displayed, such that the displayed part of the interface or the hidden part of the interface may be displayed according to a magnitude and direction of a user's drag gesture.

In at least one implementation, after dividing the display region of the screen into the at least two sub-regions according to the operation signal, the following can be conducted. Upon detecting simultaneously at each of the two curved-surface side edges a sliding signal in the preset direction, an area ratio of each of the at least two sub-regions to the display region of the screen may be adjusted according to the sliding signal.

In one example, when the terminal is in the split-screen display mode, the first sub-region and the second sub-region are displayed on the display region of the screen, where the first sub-region is used for display of the first interface, and the second sub-region is used for display of the interface of the target application. For example, when the terminal detects simultaneously at each of the two curved-surface side edges the sliding signal in the preset direction and the sliding signal is applied on the first sub-region, the area ratio of the first sub-region to the display region of the screen is decreased or increased according to the sliding signal. Since the first sub-region and the second sub-region constitute the whole display region of the screen, the area ratio of the second sub-region to the display region of the screen has a negative correlation with the area ratio of the first sub-region to the display region of the screen.

For example, when the terminal is in the split-screen display mode, the first sub-region is displayed on the upper half of the display region of the screen, and the second sub-region is displayed on the lower half of the display region of the screen, where the area ratio of the first sub-region to the display region of the screen and the area ratio of the second sub-region to the display region of the screen are both 50%. For another example, when the terminal detects simultaneously at each of the two curved-surface side edges the sliding signal in an upward direction and the sliding signal is applied on the first sub-region, the area ratio of the first sub-region to the display region of the screen is reduced according to the sliding signal, and accordingly the area ratio of the second sub-region to the display region of the screen is increased. At the end of the sliding process, the area ratio of the first sub-region to the display region of the screen may be 40%, and the area ratio of the second sub-region to the display region of the screen may be 60%.

In one example, when the terminal receives a split-screen switch instruction, the positions of the first sub-region and the second sub-region may be exchanged.

In one example, when the terminal is in the split-screen display mode, a split-screen switch button is displayed on the display region of the screen. Upon receiving a split-screen switch instruction on the split-screen switch button, the positions of the first sub-region and the second sub-region are exchanged.

In one example, after the split-screen display, the sub-regions can be closed with aid of the method herein as follows. In at least one implementation, the method further includes the following. The two sub-regions are merged, upon detecting, in the preset region at the edge of the terminal, an operation signal in a first direction and starting at one end of a sub-region boundary line between the two sub-regions. Display, in the display region merged, an interface in one sub-region of the two sub-regions on a second direction side of the sub-region boundary line, where the second direction is opposite to the first direction.

Figure 8:
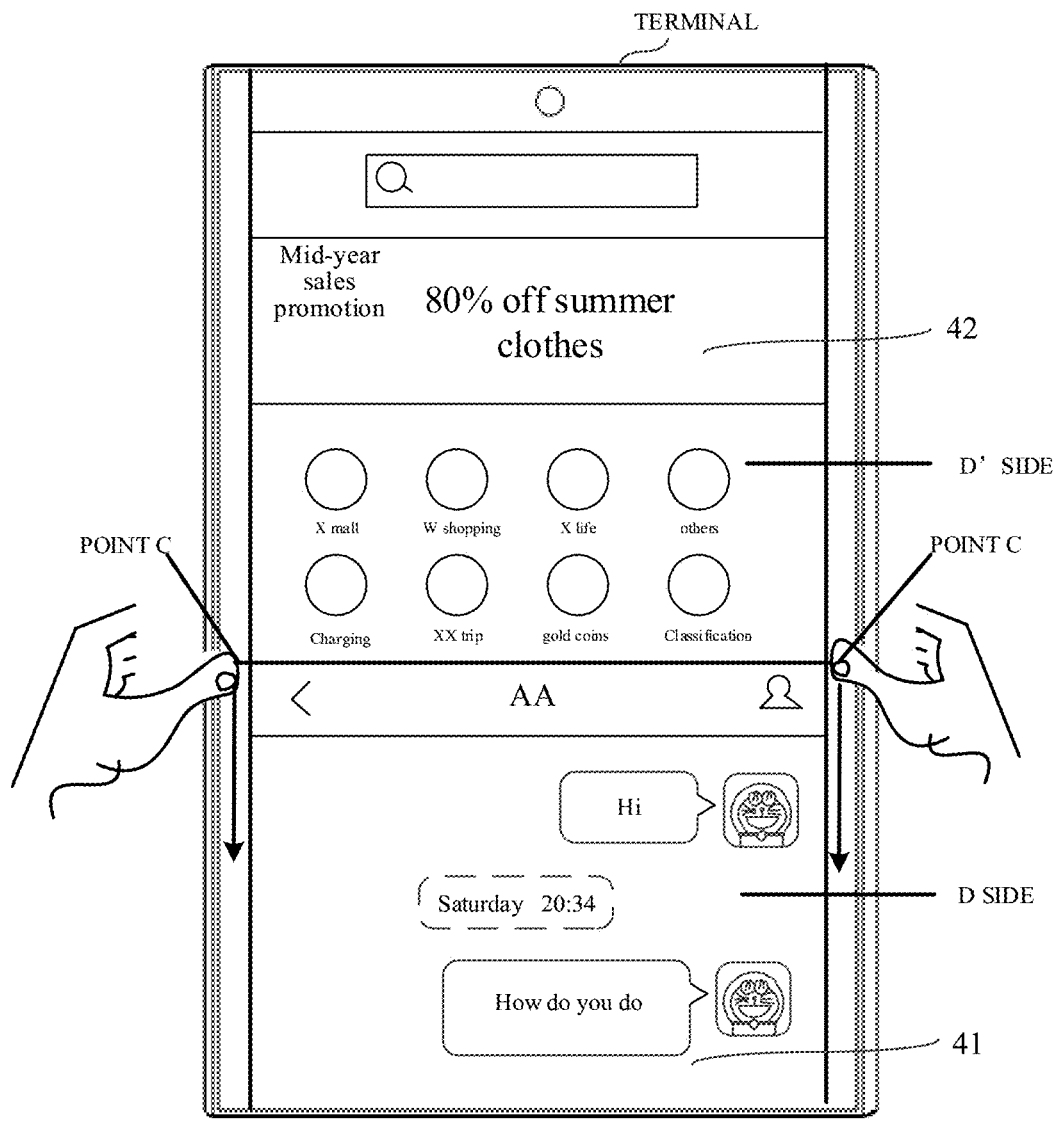
FIG. 8 is a schematic diagram illustrating exit of a split-screen mode according to at least one implementation.

In one example, based on the sub-region boundary line in FIG. 4, as illustrated in FIG. 8, when the user slides in direction D (where direction D is from the top of the edge of the terminal to the bottom of the edge of the terminal and starts at point C corresponding to one end of the sub-region boundary line between the interface of the instant messaging application and the interface of the online shopping application), the display region in which the interface of the instant messaging application is displayed and the display region in which the interface of the online shopping application is displayed are merged into one display region, that is, a full screen. In other words, the interface of the instant messaging application on a direction D side may be closed, and the interface of the online shopping application on a D' side may be displayed in a full screen mode.

In the method provided herein, while displaying the first interface, the operation signal in the preset direction is detected in the preset region at the edge of the terminal. The display region of the screen is divided into the at least two sub-regions according to the operation signal detected, where the first interface is displayed in the first sub-region of the at least two sub-regions. According to the above method for split-screen display, the preset region at the edge of the terminal can be used as a region in which split-screen display is triggered. As such, there is no need to display a virtual button on the region in which split-screen display is triggered, such that the display space will not be occupied and display of other information will not be affected.

Figure 9A:
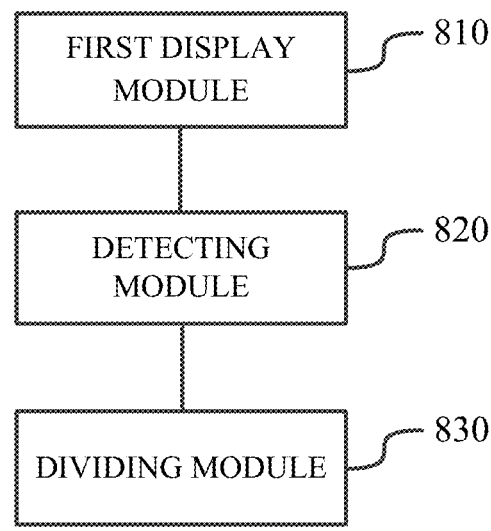
FIG. 9A is a schematic structural diagram illustrating a terminal according to at least one implementation.

According to implementations, a device for split-screen display is provided. As illustrated in FIG. 9A, the device includes a first display module 810, a detecting module 820, and a dividing module 830. The first display module 810 is configured to display a first interface in a display region of a screen of the terminal. The detecting module 820 is configured to detect, in a preset region at an edge of a terminal, an operation signal in a preset direction, while the first display module is displaying the first interface. The dividing module 830 is configured to divide the display region of the screen into at least two sub-regions according to the operation signal detected, where the first interface is displayed in a first sub-region of the at least two sub-regions.

In at least one implementation, the device further includes a second display module and a third display module. The second display module is configured to display at least one icon of at least one application after the dividing module 830 divides the display region of the screen into the at least two sub-regions. The third display module is configured to display, in a second sub-region of the at least two sub-regions, an interface of a target application, in response to receiving a selection instruction for an icon of the target application.

In at least one implementation, the dividing module 830 includes a determining unit and a generating unit. The determining unit is configured to determine a present position of the operation signal. The generating unit is configured to generate, according to the present position of the operation signal, at least one sub-region boundary line according to which the display region is divided into the at least two sub-regions.

In at least one implementation, the preset direction includes a direction from a top of the edge of the terminal to a bottom of the edge of the terminal and/or a direction from the bottom of the edge of the terminal to the top of the edge of the terminal.

In at least one implementation, the device further includes a merging module. The merging module is configured to operate as follows. The merging module is configured to merge the two sub-regions, upon detecting, in the preset region at the edge of the terminal, an operation signal in a first direction and starting at one end of a sub-region boundary line between the two sub-regions. The merging module is configured to display, in the display region merged, an interface in one sub-region of the two sub-regions on a second direction side of the sub-region boundary line, where the second direction is opposite to the first direction.

In at least one implementation, the terminal has a curved surface screen, and the preset region at the edge of the terminal refers to at least one curved-surface side edge of the curved surface screen.

In at least one implementation, the preset region at the edge of the terminal refers to two curved-surface side edges of the curved surface screen which are opposite to each other in a vertical direction. The dividing module 830 is configured to divide the display region of the curved surface screen into multiple sub-regions, upon detecting simultaneously at each of the two curved-surface side edges a sliding signal in the preset direction.

In at least one implementation, the dividing module 830 is configured to operate as follows. The dividing module 830 is configured to determine a connecting line between a present position of the sliding signal at one curved-surface side edge and a present position of the sliding signal at the other curved-surface side edge. The dividing module 830 is configured to generate, according to the connecting line, a sub-region boundary line for dividing the display region into the multiple sub-regions.

In at least one implementation, the device further includes an adjusting module. The adjusting module is configured to adjust, according to a sliding signal, an area ratio of each of the at least two sub-regions to the display region of the screen, upon detecting simultaneously at each of two curved-surface side edges the sliding signal in the preset direction.

For the device in the above implementations, the manner in which each module performs operations has been described in detail in the foregoing method implementations, which will not be elaborated herein again.

In the device described above, the operation signal in the preset direction is detected in the preset region at the edge of the terminal, while displaying the first interface. The display region of the screen is divided into the at least two sub-regions according to the operation signal detected, where the first interface is displayed in the first sub-region of the at least two sub-regions. According to the above implementations, the preset region at the edge of the terminal can be used as a region in which split-screen display is triggered, and there is no need to display a virtual button on the region in which split-screen display is triggered. In this way, the display space will not be occupied and the display of other information will not be affected.

It should be noted that, as for the device in the split-screen display mode, the division of the above-mentioned functional modules is for illustrative purpose only. In practical situations, the above-mentioned functions may be achieved by different functional modules according to different needs, that is, the internal structure of the device is divided into different functional modules to complete all or part of the functions. In addition, the device described above and the method for the split-screen display have the same concept. For the specific implementation process thereof, reference may be made to the related description of the foregoing method implementations, which is not described herein again.

Figure 9B:
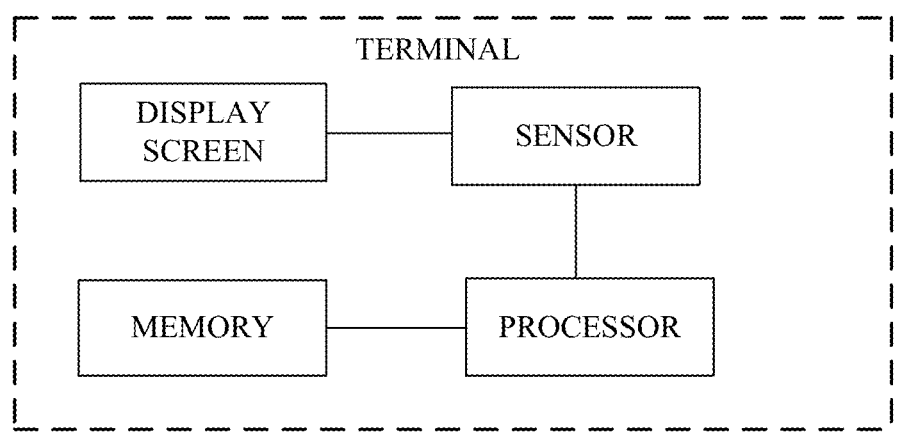
FIG. 9B is a schematic structural diagram illustrating a terminal according to at least one implementation.

As illustrated in FIG. 9B, a terminal is provided. The terminal includes a display screen, a processor, a sensor, and a memory. The display screen has a display region. The sensor is configured to detect a first operation signal in a preset region, where the preset region is at an edge of the display screen. The memory is configured to store computer programs which, when executed by the processor, are operable with the processor to perform the following. A first interface is displayed in the display region of the display screen. The display region of the display screen is divided into at least two sub-regions according to the first operation signal detected by the sensor, where the first interface is displayed in a first sub-region of the at least two sub-regions.

In at least one implementation, the computer programs are further operable with the processor to operate as follows. The computer programs are further operable with the processor to display at least one icon of at least one application, to receive a selection instruction for an icon of a target application, and to display, in a second sub-region of the at least two sub-regions, an interface of the target application.

In at least one implementation, the computer programs operable with the processor to divide the display region into the at least two sub-regions according to the first operation signal are operable with the processor to: determine a present position of the first operation signal, and to generate, according to the present position of the first operation signal, at least one sub-region boundary line according to which the display region is divided into the at least two sub-regions.

In at least one implementation, the sensor is further configured to detect, in the preset region, a second operation signal starting at one end of a sub-region boundary line between the two sub-regions and in a first direction perpendicular to the sub-region boundary line. The processor is further configured to merge, according to the second operation signal, the two sub-regions to obtain a merged display region, and to display, in the merged display region, an interface previously displayed in one sub-region of the two sub-regions on a second direction side of the sub-region boundary line, where the second direction is opposite to the first direction.

In at least one implementation, the display screen is a curved surface screen, and the preset region refers to two curved-surface side edges of the curved surface screen which are opposite to each other in a vertical direction. The sensor is configured to detect simultaneously at each of the two curved-surface side edges a sliding signal in the preset direction.

In at least one implementation, the computer programs operable with the processor to divide the display region of the display screen into the at least two sub-regions according to the first operation signal are operable with the processor to divide the display region of the curved surface screen into multiple sub-regions according to the sliding signals detected by the sensor.

In at least one implementation, the computer programs operable with the processor to divide the display region of the curved surface screen into the multiple sub-regions according to the sliding signals detected by the sensor are operable with the processor to: determine a connecting line between a present position of the sliding signal at one curved-surface side edge and a present position of the sliding signal at the other curved-surface side edge; divide the display region into the multiple sub-regions according to the connecting line.

In at least one implementation, the computer programs are further operable with the processor to adjust, according to the sliding signals detected by the sensor, an area ratio of each of the at least two sub-regions to the display region of the curved surface screen.

Figure 10:
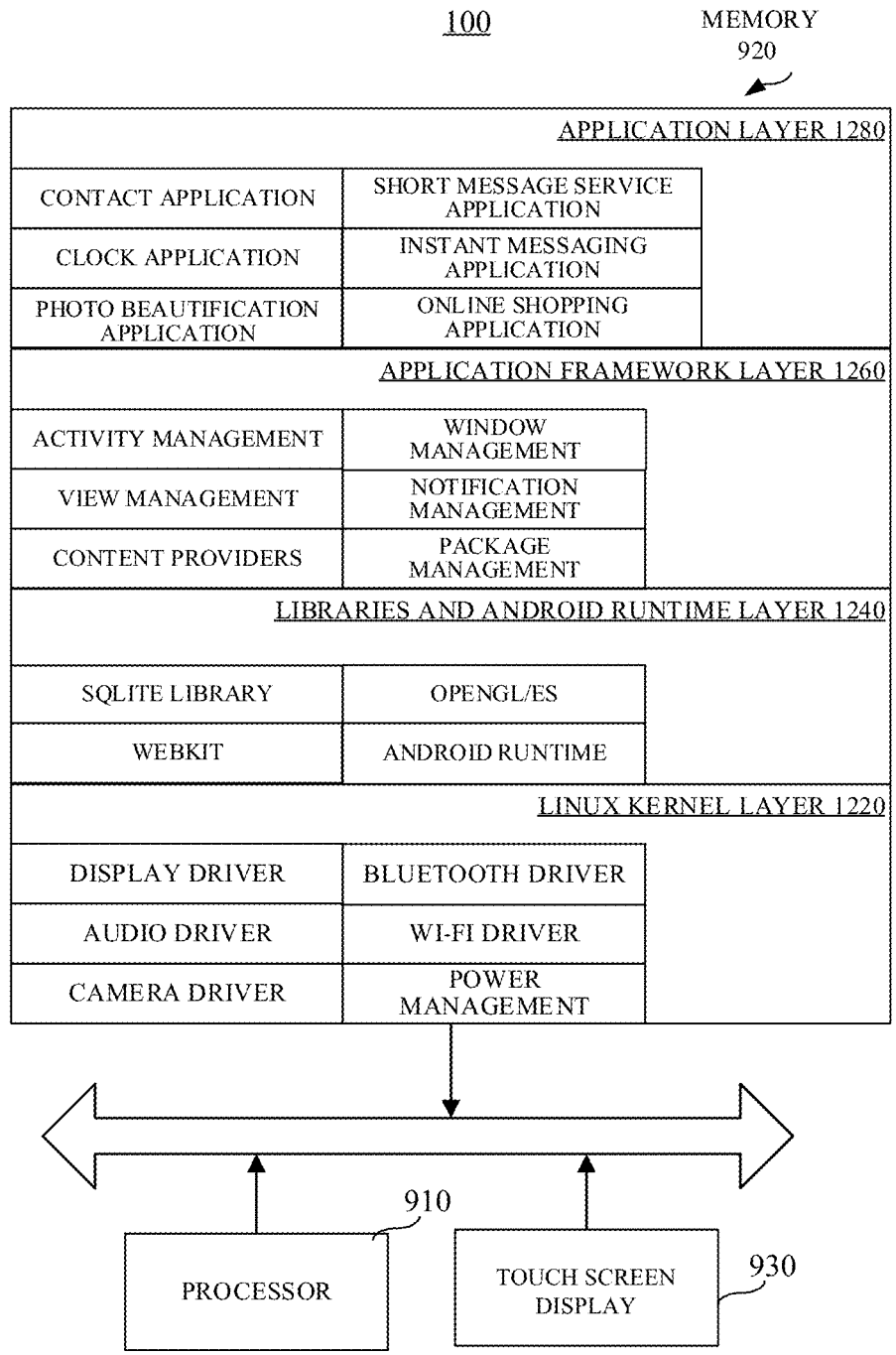
FIG. 10 is a structural block diagram illustrating a terminal according to implementations.
Figure 11:
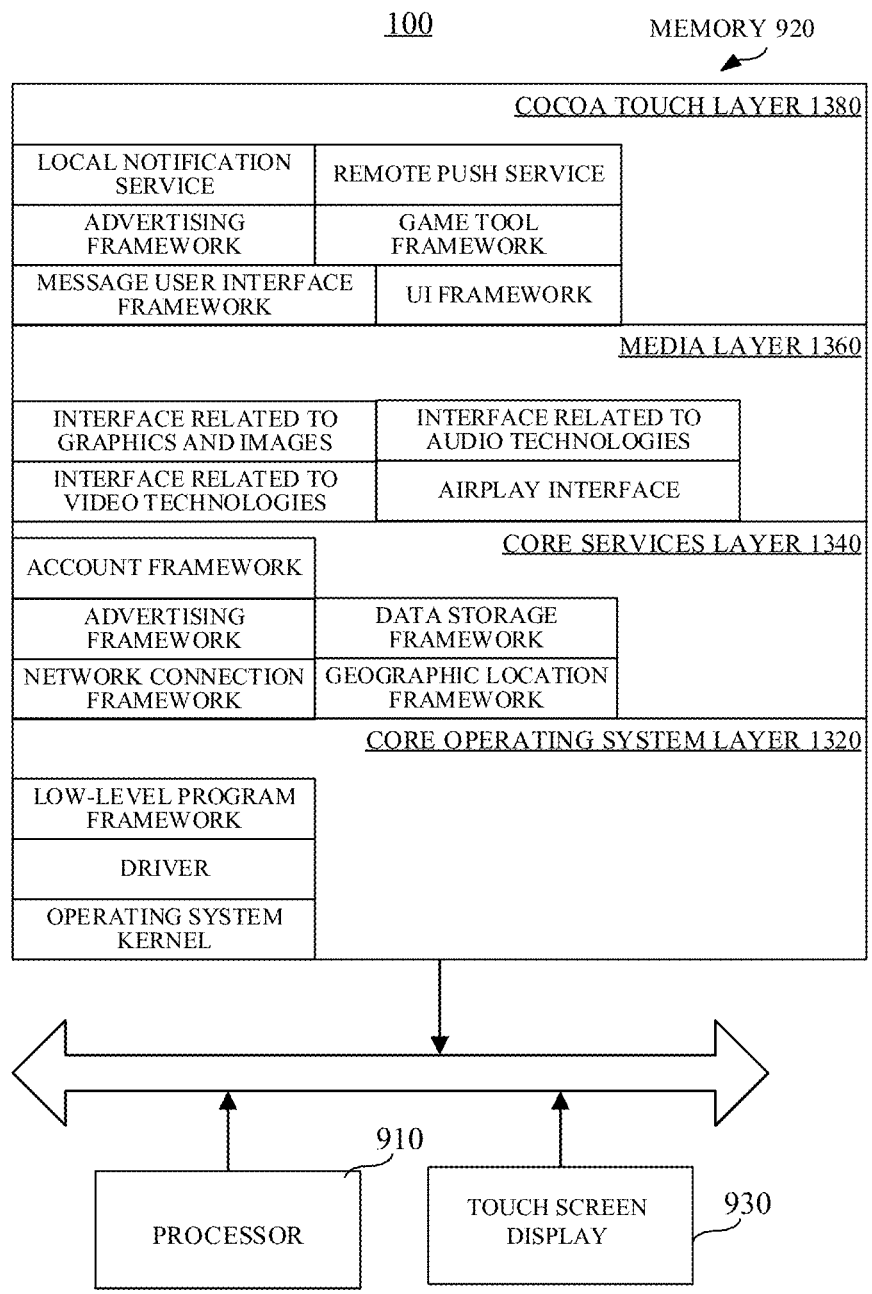
FIG. 11 is a structural block diagram illustrating a terminal according to other implementations.

FIG. 10 and FIG. 11 are structural block diagrams illustrating a terminal 100 according to at least one implementation. The terminal 100 may be the above-described terminal, such as a mobile phone, a tablet computer, a notebook computer, an e-book, or the like. The terminal 100 may include one or more of a processor 910, a memory 920, and a touch screen display 930.

The processor 910 may include one or more processing cores. The processor 910 is configured to connect various parts of the entire terminal 100 through various interfaces and lines, and to execute various functions of the terminal 100 and process data by running or executing instructions, programs, a code set, or an instruction set stored in the memory 920 and invoking data stored in the memory 920. In one example, the processor 910 may be implemented, in the form of hardware, by at least one of: a digital signal processing (DSP), a field-programmable gate array (FPGA), or a programmable logic array (PLA). The processor 910 may be integrated with one or more of a CPU, a graphics processing unit (GPU), a modem, and the like. In one example, the CPU is mainly configured to handle an operating system, a user interface, and applications. The GPU is configured to process rendering and drawing of content to be displayed by the touch screen display 930. The modem is configured to deal with wireless communication. It will be appreciated that the modem mentioned above may not be integrated into the processor 910 and can be implemented by a single chip.

The memory 920 may include a RAM, and may also include a read-only memory (ROM). In one example, the memory 920 includes a non-transitory computer readable storage medium. The memory 920 may be configured to store instructions, programs, codes, a code set, or an instruction set. The memory 920 may include a program storage region and a data storage region. The program storage region may store instructions of an operating system, instructions required for at least one function (such as a touch function, a sound playback function, an image playback function, etc.), and instructions for implementing the following method implementations. The data storage region may store data (such as audio data, contact list) created according to use of the terminal 100.

The following describes an Android® system as an example of the operating system. Programs and data stored in the memory 920 are illustrated in FIG. 10. The memory 920 stores a Linux kernel layer 1220, Libraries and Android RunTime layer 1240, an application framework layer 1260, and an application layer 1280. The Linux kernel layer 1220 is configured to provide low-level drivers for various hardware of the terminal 100, such as a display driver, an audio driver, a camera driver, a Bluetooth driver, a Wi-Fi driver, power management, and so on. The Libraries and Android RunTime layer 1240 is configured to provide main feature support for the Android® system through some C/C++ libraries. For example, the SQLite library is configured to provide support for a database, the OpenGL/ES library is configured to provide support for 3D drawing, and the Webkit library is configured to provide support for browser kernels. The Libraries and Android RunTime layer 1240 further includes Android RunTime, which mainly provides some core libraries for allowing developers to write Android applications in the Java language. The application framework layer 1260 is configured to provide various APIs that may be used when building applications, such that developers can also use these APIs to build their own applications, such as activity management, window management, view management, notification management, content providers, package management, call management, resource management, and location management. There is at least one application running in the application layer 1280. The at least one application may be native applications for the operating system such as a contact application, a short message service (SMS) application, a clock application, a camera application, etc. The at least one application may also be applications developed by third-party developers, such as an instant messaging application, a photo beautification application and so on.

The following describes an iOS® system as an example of the operating system. Programs and data stored in the memory 920 are illustrated in FIG. 11. The iOS® system includes a core operating system layer 1320, a core services layer 1340, a media layer 1360, and a Cocoa Touch layer 1380. The core operating system layer 1320 includes an operating system kernel, drivers, and low-level program frameworks. The low-level program frameworks are configured to provide functions closer to hardware implementations for use by program frameworks in the core services layer 1340. The core services layer 1340 is configured to provide at least one of system services or program frameworks required by the applications, such as a foundation framework, an account framework, an advertising framework, a data storage framework, a network connection framework, a geographic location framework, a motion framework, and so on. The media layer 1360 is configured to provide audio-visual-related interfaces for applications, such as an interface related to graphics and images, an interface related to audio technologies, an interface related to video technologies, and an AirPlay interface for audio and video transmission technologies. The Cocoa Touch layer 1380 is configured to provide a variety of commonly-used frameworks related to interfaces for application development, and is configured to provide user's touch interactive operations on the terminal 100, such as a local notification service, a remote push service, an advertising framework, a game tool framework, a message user interface (UI) framework, a UIKit framework, a map framework, and so on.

As illustrated in FIG. 11, frameworks related to most applications include, but are not limited to: the foundation framework in the Core Services layer 1340 and the UIKit framework in the Cocoa Touch layer 1380. The foundation framework is configured to provide many basic object classes and data types, and to provide the most basic system services for all applications regardless of the UI. The classes in the UIKit framework are basic UI class libraries for creating touch-based user interfaces. iOS® applications can provide UI based on the UIKit framework, which provides the application's basic architecture for building user interfaces, drawing, handling user interaction events, and responding to gestures.

The touch screen display 930 is configured to receive a touch operation thereon or near the touch screen display 930 performed by a user with a finger, a touch pen, or any other suitable object, and to display user interfaces of various applications. The touch screen display 930 is generally disposed on a front panel of the terminal 100. The touch screen display 930 may be a full screen, a curved surface screen, or a special-shaped screen. The touch screen display 930 can also be a combination of a full screen and a curved surface screen, or a combination of a special-shaped screen and a curved surface screen. There is no restriction on the structure of the touch screen display 930.

Curved Surface Screen

Figure 12:
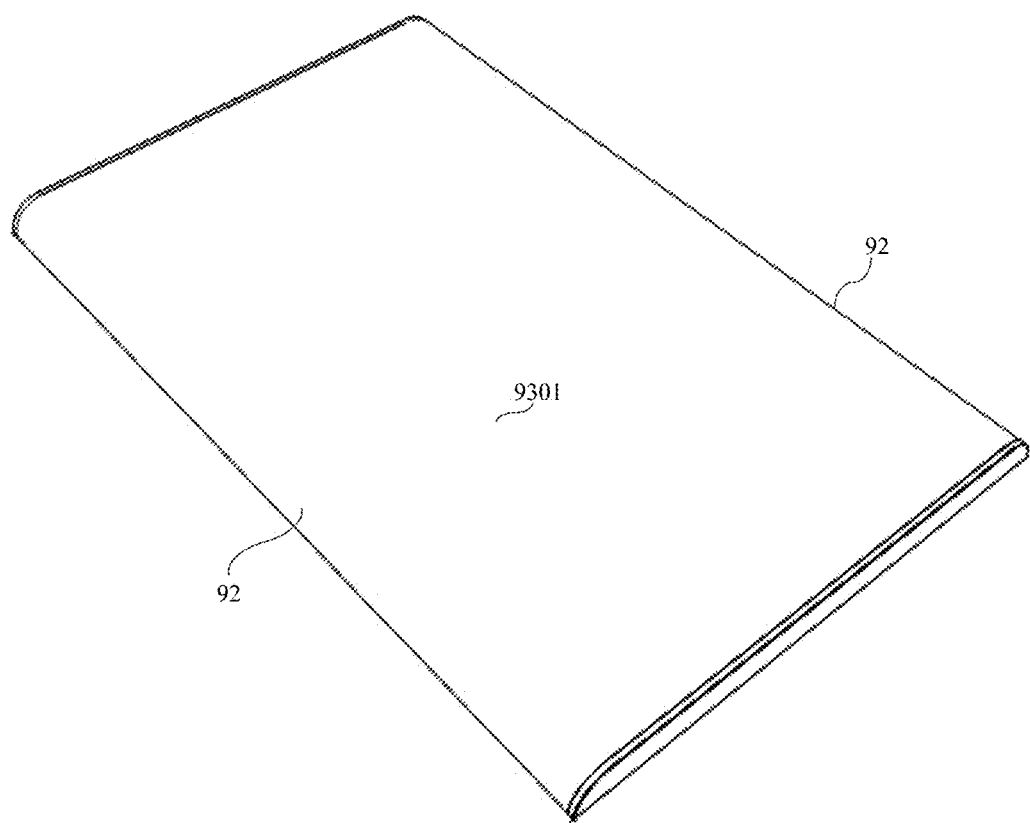
FIG. 12 is a schematic structural diagram illustrating a curved surface screen according to at least one implementation.

The curved surface screen refers to a screen in which a screen region of a touch screen display 9301 is not on the same plane. In one example, the curved surface screen has at least a curved cross section (that is, the cross section has a curved shape), and the projection of the curved surface screen in any plane direction perpendicular to the cross section is a plane. The curved shape may be U-shaped. In one example, the curved surface screen refers to a screen of which at least one side edge has a curved shape. In one example, the curved surface screen refers to a screen in which at least one side edge of the touch screen display 9301 extends to cover the middle frame of the terminal 100. Since the side edge of the touch screen display 9301 extends to cover the middle frame of the terminal 100, the middle frame which has no display function and touch function is covered to provide a displayable region and/or an operable region, so that the curved surface screen has a higher screen-to-body ratio. As illustrated in FIG. 12, the curved surface screen refers to a screen of which left and right side edges 92 have curved shapes. Alternatively, the curved surface screen refers to a screen of which upper and lower side edges have curved shapes. Alternatively, the curved surface screen refers to a screen of which four side edges on the top, bottom, left, and right have curved shapes. In some examples, the curved surface screen is made from a touch screen material with a certain flexibility.

Full Screen

Figure 13:
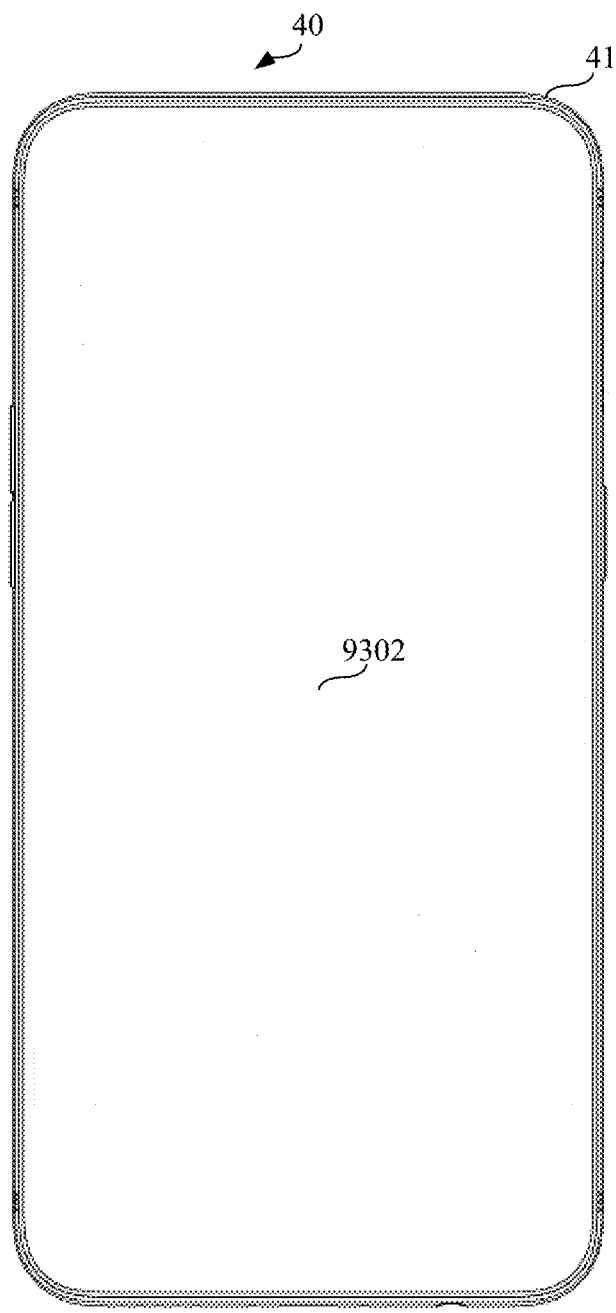
FIG. 13 is a schematic structural diagram illustrating a full screen according to at least one implementation.

The full screen may refer to a screen whose screen-to-body ratio (that is, a ratio of a touch screen display 9302 to the front panel of the terminal 100) exceeds a threshold ratio (such as 80%, 90%, or 95%). The screen-to-body ratio may be calculated in the following manners. The screen-to-body ratio is obtained by (an area of the touch screen display 9302/an area of the front panel of the terminal 100)*100%. Alternatively, the screen-to-body ratio is obtained by (an area of an actual display region of the touch screen display 9302/the area of the front panel of terminal 100)*100%. Alternatively, the screen-to-body ratio is obtained by (a diagonal of touch screen display 9302/a diagonal of the front panel of terminal 100)*100%. As illustrated in FIG. 13, almost all regions on the front panel of the terminal 100 are the touch screen display 9302. On the front panel 40 of the terminal 100, all regions other than an edge generated by the middle frame 41 are the touch screen display 9302. The four corners of the touch screen display 9302 may be right-angled or rounded.

The full screen may also be a screen in which at least one front panel component is integrated inside or below the touch screen display 9302. In one example, the at least one front panel component includes a camera, a fingerprint sensor, a proximity light sensor, a distance sensor, and the like. In some examples, other components on the front panel of the traditional terminal are integrated into all or part of the touch screen display 9302. For example, after photosensitive elements in the camera is divided into multiple photosensitive pixels, each photosensitive pixel is integrated into a black region in each display pixel in the touch screen display 9302. Since the at least one front panel component is integrated inside the touch screen display 9302, the full screen has a higher screen-to-body ratio.

In other examples, the components on the front panel of the traditional terminal can be on the side or back of the terminal 100, for example, an ultrasonic fingerprint sensor is arranged below the touch screen display 9302, or a bone-conducting earpiece is arranged inside the terminal 100, and the camera is arranged on the side of the terminal 100 and has a pluggable structure.

In some examples, when the terminal 100 has a full screen, there are edge touch sensors 1201 arranged on a single side edge, or two side edges (such as left and right side edges), or four side edges (such as side edges on the top, bottom, left, and right) of the middle frame of the terminal 100. The edge touch sensors 1201 are configured to detect at least one of: a touch operation, a click operation, a pressing operation, or a sliding operation against the middle frame by a user. The edge touch sensors 1201 may be any one of: a touch sensor, a thermal sensor, or a pressure sensor. The user can perform operations against the edge touch sensors 1201 to control applications in the terminal 100.

In on example, a non-transitory computer readable storage medium including instructions is provided, such as the memory 920 including instructions. The instructions, when executed by the processor 910 of the terminal 100, cause the processor to perform the above-described method. In one example, the computer readable storage medium may be a ROM, a RAM, a compact disc ROM (CD-ROM), a tape, a floppy disk, an optical data storage device, and the like.

In at least one implementation, a computer readable storage medium including instructions is provided. The instructions, when executed by a processor of a terminal, cause the terminal to perform the following. A first interface is displayed in a display region of a screen of the terminal. An operation signal in a preset direction is detected in a preset region at an edge of the terminal, while displaying the first interface. The display region of the screen is divided into at least two sub-regions according to the operation signal detected, where the first interface is displayed in a first sub-region of the at least two sub-regions.

In one example, after dividing the display region of the screen into the at least two sub-regions according to the operation signal detected, the following can be conducted. At least one icon of at least one application is displayed. In response to receiving a selection instruction for an icon of a target application, an interface of the target application is displayed in a second sub-region of the at least two sub-regions.

In one example, the display region of the screen is divided into the at least two sub-regions according to the operation signal detected as follows. A present position of the operation signal is determined. According to the present position of the operation signal, generate at least one sub-region boundary line according to which the display region is divided into the at least two sub-regions.

In one example, the preset direction includes at least one of: a direction from a top of the edge of the terminal to a bottom of the edge of the terminal or a direction from the bottom of the edge of the terminal to the top of the edge of the terminal.

In one example, the method further includes the following. The two sub-regions are merged, upon detecting, in the preset region at the edge of the terminal, an operation signal in a first direction and starting at one end of a sub-region boundary line between the two sub-regions. Display, in the display region merged, an interface in one sub-region of the two sub-regions on a second direction side of the sub-region boundary line, where the second direction is opposite to the first direction.

In one example, the terminal has a curved surface screen, and the preset region at the edge of the terminal refers to at least one curved-surface side edge of the curved surface screen.

In one example, the preset region at the edge of the terminal refers to two curved-surface side edges of the curved surface screen which are opposite to each other in a vertical direction. The display region of the screen is divided into the at least two sub-regions according to the operation signal detected as follows. Upon detecting simultaneously at each of the two curved-surface side edges an operation signal in the preset direction, the display region of the curved surface screen is divided into multiple sub-regions.

In one example, the display region of the curved surface screen is divided into the multiple sub-regions upon detecting simultaneously at each of the two curved-surface side edges the operation signal in the preset direction as follows. Determine a connecting line between a present position of the sliding signal at one curved-surface side edge and a present position of the sliding signal at the other curved-surface side edge. According to the connecting line, a sub-region boundary line for dividing the display region into the multiple sub-regions is generated.

After considering the specification and implementing the disclosure described herein, those of ordinary skill in the art will readily think of other implementations of the disclosure. The disclosure is intended to cover any modifications, uses, or adaptive changes to the implementations. These modifications, uses, or adaptive changes follow the general principles of the implementations and include common knowledge or conventional technical means in the technical field that are not disclosed in the implementations. The specification and examples are merely illustrative, with the scope and spirit of the implementations of the disclosure being defined by the appended claims.

It should be understood that the implementations of the disclosure are not limited to structures that have been described above and illustrated in the accompanying drawings, and various modifications and changes can be made without departing from the scope of the implementations. The scope of the disclosure is limited only by the appended claims.

What is claimed is:

1. A method for split-screen display for a terminal, the method comprising:
 displaying a first interface in a display region of a screen of the terminal;
 detecting, in a preset region at an edge of the screen, a first operation signal in a preset direction, while displaying the first interface;
 dividing the display region of the screen into at least two sub-regions according to the first operation signal detected, wherein the first interface is displayed in a first sub-region of the at least two sub-regions;
 displaying at least one icon of at least one application in the first sub-region in such a manner that the at least one icon overlaps the first interface; and
 displaying, in a second sub-region of the at least two sub-regions, an interface of a target application of the at least one application, in response to receiving a selection instruction for an icon of the target application,
 wherein the terminal has a curved surface screen, and the preset region refers to two curved-surface side edges of the curved surface screen which are opposite to each other in a vertical direction, wherein dividing the display region of the screen into the at least two sub-regions according to the first operation signal comprises:
   dividing the display region of the curved surface screen into a plurality of sub-regions, upon detecting simultaneously at each of the two curved-surface side edges a sliding signal in the preset direction.

2. The method of claim 1, wherein dividing the display region of the curved surface screen into the plurality of sub-regions, upon detecting simultaneously at each of the two curved-surface side edges the sliding signal in the preset direction comprises:
   determining a connecting line between a present position of the sliding signal at one curved-surface side edge and a present position of the sliding signal at the other curved-surface side edge; and
   dividing, according to the connecting line, the display region into the plurality of sub-regions.

3. The method of claim 1, further comprising:
   after dividing the display region of the screen into the at least two sub-regions according to the first operation signal,
      adjusting, according to the sliding signals, an area ratio of each of the at least two sub-regions to the display region of the curved surface screen.

4. A terminal, comprising:
   a display screen having a display region;
   a sensor configured to detect a first operation signal in a preset region, wherein the preset region is at an edge of the display screen;
   a processor; and
   a memory configured to store computer programs which, when executed by the processor, are operable with the processor to:
      display a first interface in the display region;
      divide the display region into at least two sub-regions according to the first operation signal detected by the sensor, wherein the first interface is displayed in a first sub-region of the at least two sub-regions;
      display at least one icon of at least one application in the first sub-region in such a manner that the at least one icon overlaps the first interface; and
      display, in a second sub-region of the at least two sub-regions, an interface of a target application of the at least one application, in response to receiving a selection instruction for an icon of the target application,
   wherein the display screen is a curved surface screen, and the preset region refers to two curved-surface side edges of the curved surface screen which are opposite to each other in a vertical direction,
   wherein the sensor is configured to detect simultaneously at each of the two curved-surface edges a sliding signal in the preset direction.

5. The terminal of claim 4, wherein the computer programs operable with the processor to divide the display region into the at least two sub-regions according to the first operation signal are operable with the processor to:
   divide the display region of the curved surface screen into a plurality of sub-regions according to the sliding signals detected by the sensor.

6. The terminal of claim 5, wherein the computer programs operable with the processor to divide the display region of the curved surface screen into the plurality of sub-regions according to the sliding signals detected by the sensor are operable with the processor to:
   determine a connecting line between a present position of the sliding signal at one curved-surface side edge and a present position of the sliding signal at the other curved-surface side edge; and
   divide the display region of the curved surface screen into the plurality of sub-regions according to the connecting line.

7. The terminal of claim 5, wherein the computer programs are further operable with the processor to:
   adjust, according to the sliding signals detected by the sensor, an area ratio of each of the at least two sub-regions to the display region of the curved surface screen.

* * * * *